(12) United States Patent
Suematsu (10) Patent No.: US 9,568,904 B2
(45) Date of Patent: Feb. 14, 2017

(54) DISPLAY METHOD OF SYNCHRONOUS CONTROL PROGRAM FOR CONTROLLING DRIVING OF MULTI-AXIS SYNCHRONOUS CONTROL DEVICE

(75) Inventor: Keiji Suematsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 337 days.

(21) Appl. No.: 14/370,405

(22) PCT Filed: Jan. 27, 2012

(86) PCT No.: PCT/JP2012/051826
§ 371 (c)(1),
(2), (4) Date: Jul. 2, 2014

(87) PCT Pub. No.: WO2013/111325
PCT Pub. Date: Aug. 1, 2013

(65) Prior Publication Data
US 2014/0364964 A1    Dec. 11, 2014

(51) Int. Cl.
*G06F 19/00* (2011.01)
*G05B 15/02* (2006.01)
(Continued)

(52) U.S. Cl.
CPC ........... *G05B 15/02* (2013.01); *G05B 19/0426* (2013.01); *G05B 19/195* (2013.01);
(Continued)

(58) Field of Classification Search
USPC ..................................................... 700/17, 83
See application file for complete search history.

(56) References Cited

U.S. PATENT DOCUMENTS 5,355,062 A    10/1994  Takizawa et al.
5,642,024 A     6/1997  Okada et al.
(Continued)

FOREIGN PATENT DOCUMENTS

JP    05-073147 A    3/1993
JP    07-219639 A    8/1995
(Continued)

OTHER PUBLICATIONS

Tetsuji Honnami, et al., "Mitsubishi iQ Platform-compatible Motion Controller Engineering Software "MELSOFT MT Works2"—Latest Technologies of Factory Automation (FA)—FA Controllers and Engineering Environment—", Mitsubishi Denki Giho, Mar. 25, 2010, vol. 84, No. 3.

(Continued)

*Primary Examiner* — Kidest Bahta
(74) *Attorney, Agent, or Firm* — Sughrue Mion, PLLC; Richard C. Turner (57) ABSTRACT

Among a plurality of synchronous control programs each configured to include a plurality of output software modules with respect to one driving software module, a synchronous control program of a multi-axis configuration, in which driving software modules are coupled together into a same axis, is displayed on one screen. On this display screen, display is switched between a parameter setting screen, status information on respective software modules, and a waveform graph of the driving software module and the output software modules, in order to enable work ranging from software designing to debugging to be efficiently performed.

6 Claims, 8 Drawing Sheets

(51) Int. Cl.
    *G05B 19/042* (2006.01)
    *G05B 19/19* (2006.01)
(52) U.S. Cl.
    CPC .............. *G05B 2219/23291* (2013.01); *G05B 2219/32137* (2013.01); *G05B 2219/50234* (2013.01); *Y02P 90/16* (2015.11); *Y02P 90/185* (2015.11)

(56) References Cited

U.S. PATENT DOCUMENTS

| | | | | |
|---|---|---|---|---|
| 2005/0033459 | A1* | 2/2005 | Otsuki | B25J 9/1623 700/61 |
| 2006/0100723 | A1* | 5/2006 | Sun | G05B 19/4141 700/61 |
| 2011/0137434 | A1* | 6/2011 | Chang | G05B 19/4083 700/86 |

FOREIGN PATENT DOCUMENTS

| | | |
|---|---|---|
| JP | 11-134033 A | 5/1999 |
| JP | 2000-250630 A | 9/2000 |
| JP | 2000-330615 A | 11/2000 |
| JP | 2005-092806 A | 4/2005 |
| JP | 2005-092807 A | 4/2005 |
| JP | 2006-323582 A | 11/2006 |
| JP | 2008-033898 A | 2/2008 |

OTHER PUBLICATIONS

Takayuki Yamaoka, et al., "Mitsubishi iQ Platform-compatible Programmable Controller Engineering Software "MELSOFT GX Works2"—Latest Technologies of Factory Automation (FA)—FA Controllers and Engineering Environment—", Mitsubishi Denki Giho, Mar. 25, 2010, vol. 84, No. 3.
International Search Report for PCT/JP2012/051826 dated Apr. 24, 2012, which was previously filed on Jul. 2, 2014 <PCT/ISA/210>.
International Search Report, PCT/JP2012/051826, dated Apr. 24, 2012.
Notice of Rejection for corresponding JP 2012-533422, dated Sep. 5, 2012.

* cited by examiner

DISPLAY METHOD OF SYNCHRONOUS CONTROL PROGRAM FOR CONTROLLING DRIVING OF MULTI-AXIS SYNCHRONOUS CONTROL DEVICE

CROSS REFERENCE TO RELATED APPLICATIONS

This application is a National Stage of International Application No. PCT/JP2012/051826 filed Jan. 27, 2012, the contents of all of which are incorporated herein by reference in their entirety.

FIELD

The present invention relates to a display method of a synchronous control program for controlling driving of a multi-axis synchronous control device.

BACKGROUND

A synchronous control program for controlling driving of a multi-axis synchronous control device is generated in a one-to-one relationship with each of a plurality of axes on which the multi-axis synchronous control device executes positioning control. When the multi-axis synchronous control device is assumed to include two or more sets of a configuration in which one servo amplifier controls one servo motor arranged for one axis, in this multi-axis synchronous control device, the servo amplifier for each axis controls driving of its corresponding servo motor (that is, the axis) according to a control signal of the corresponding synchronous control program, thereby realizing positioning control on the axis.

This synchronous control program is constituted by a plurality of software modules in which various parameters are set for the corresponding axis. One of the software modules is a driving software module that generates and outputs reference position information for synchronization of the axes on which the multi-axis synchronous control device executes positioning control.

The multi-axis synchronous control device is configured such that, upon executing positioning control on the axes according to the respective synchronous control programs that individually control the axes, when the settings of the driving software modules are the same as each other in the respective synchronous control programs that individually control each of the axes, the multi-axis synchronous control device executes positioning control on the axes while synchronizing the axes with each other.

Meanwhile, in a case where each of the synchronous control programs, which are in the process of controlling driving of the multi-axis synchronous control device, is displayed on a display screen of a display device, each of the software modules that constitute the synchronous control program is displayed with a distinction between operating and non-operating at a predetermined display position on the display screen, in order for a user to easily understand the operation image and to check the program configuration.

In this display method, in a case where there are a plurality of synchronous control programs in which the settings of their respective driving software modules are the same as each other, the multi-axis synchronous control device operates so as to execute positioning control while synchronizing the synchronous control programs with each other using one of the driving software modules as a main axis. However, the synchronous control programs in which the settings of their respective driving software modules are the same as each other are displayed axis by axis, that is, program by program.

CITATION LIST

Patent Literature

Patent Literature 1: Japanese Patent Application Laid-open No. H5-73147

SUMMARY

Technical Problem

In a conventional technique related to displaying a synchronous control program, a non-operating software module is not hidden, but is still dimly displayed and all the software modules are displayed at fixed positions and distinguished from each other only by the light and dark contrast of the display elements. This display makes it difficult to understand the actual configuration.

Furthermore, display and setting of the synchronous control program are performed for each axis. Therefore, in a case of a plurality of synchronous control programs that execute positioning control on a plurality of axes while synchronizing the axes with each other, the entire software module configuration, in which associated axes are coupled together, is not displayed. This makes it difficult to understand a synchronous control operation of the multi-axis synchronous control device.

Further, although it is possible to display an operating state of each software module on a specific monitoring display screen, which displays an operating state of a motion controller and is separate from the display screen for the synchronous control programs, the operating state of each software module cannot be displayed on the display screen for the synchronous control programs, which results in poor workability.

The present invention has been achieved to solve the above problems, and an object of the present invention is to obtain a display method of a synchronous control program for controlling driving of a multi-axis synchronous control device capable of efficiently performing display and setting of a software module configuration of a synchronous control program of a multi-axis configuration.

Solution to Problem

In order to solve the above problems and achieve the object, a display method of a synchronous control program for controlling driving of a multi-axis synchronous control device according to the present invention, wherein in a multi-axis synchronous control system that includes a multi-axis synchronous control device that, upon executing positioning control on a plurality of axes according to a plurality of synchronous control programs that are respectively input to the axes, when settings of driving software modules in the synchronous control programs are same as each other, executes positioning control while synchronizing the axes with each other, a control device that generates the synchronous control programs for the axes on which the multi-axis synchronous control device executes positioning control, axis by axis, and that outputs the generated synchronous control programs to the multi-axis synchronous control device, and a display device, and as a step of, by the control device, displaying a plurality of synchronous control programs that are executed by the multi-axis synchronous control device on a display screen of the display device, the display method comprises: a first displaying step of displaying the synchronous control programs axis by axis by using a plurality of screens; and a second displaying step of displaying on one screen a synchronous control program of a multi-axis configuration, in which the driving software modules are coupled together into a same axis, among the synchronous control programs.

Advantageous Effects of Invention

According to the present invention, a plurality of synchronous control programs, in which the axis setting of a driving software module is the same for a plurality of axes, can be reconfigured as a synchronous control program of a multi-axis configuration and be displayed on one screen. Therefore, display and setting of a software module configuration of the synchronous control program of a multi-axis configuration can be performed efficiently. Accordingly, the operation image of a multi-axis synchronous control device can be more easily understood, and a setting error can be prevented by checking the program. Accordingly, an effect is obtained where it is possible to efficiently perform work ranging from software designing to debugging.

DESCRIPTION OF EMBODIMENTS

Exemplary embodiments of a display method of a synchronous control program for controlling driving of a multi-axis synchronous control device according to the present invention will be explained below in detail with reference to the drawings. The present invention is not limited to the embodiments.

Embodiment

Figure 1:
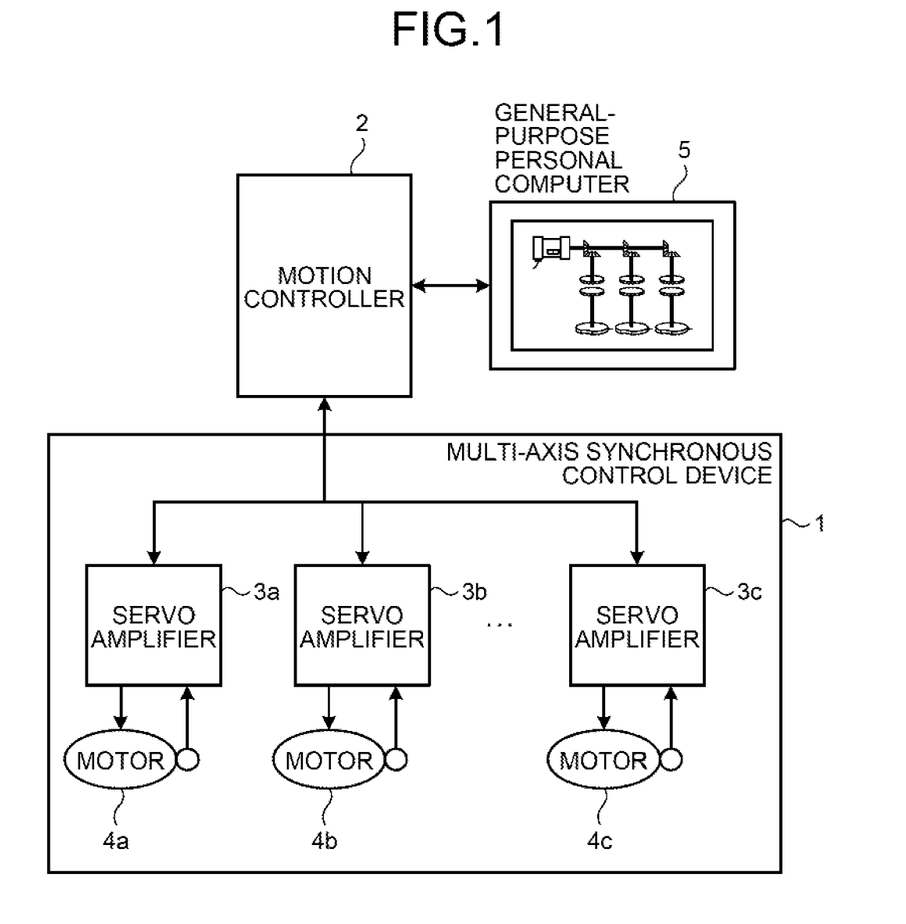
FIG. 1 is a block diagram of the configuration of relevant parts of a multi-axis synchronous control system that performs a display method of a synchronous control program for controlling driving of a multi-axis synchronous control device according to an embodiment of the present invention.

FIG. 1 is a block diagram of the configuration of relevant parts of a multi-axis synchronous control system that performs a display method of a synchronous control program for controlling driving of a multi-axis synchronous control device according to an embodiment of the present invention.

In FIG. 1, the multi-axis synchronous control system is a system that executes positioning control while synchronizing a plurality of servo motors with each other in a filling machine, a packing machine, a machine tool, or the like, and includes a multi-axis synchronous control device 1, a motion controller 2, and a general-purpose personal computer 5.

The multi-axis synchronous control device 1 includes two or more servo motors 4a to 4c and servo amplifiers 3a to 3c that are as many as the number of the servo motors 4a and 4c. In FIG. 1, for the sake of easy understanding, the multi-axis synchronous control device is assumed to include two or more sets of a configuration in which one servo amplifier controls one servo motor arranged for one axis.

The motion controller 2 generates and outputs a control signal to a corresponding one of the servo amplifiers 3a to 3c according to the synchronous control program that is input to each axis from the general-purpose personal computer 5. The general-purpose personal computer 5 creates the synchronous control program for each axis, writes the created synchronous control programs to the motion controller 2, reads the operating states of the synchronous control programs in the motion controller 2, and displays the operating states on a display screen (a window screen).

Figure 2:
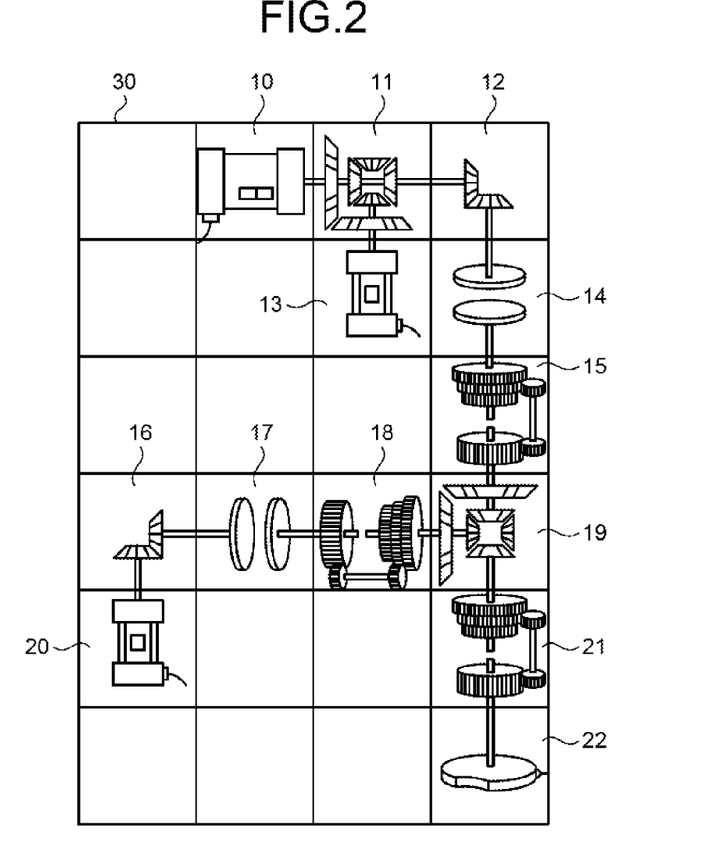
FIG. 2 is a diagram illustrating a configuration example of a synchronous control program for one axis, that is, one of synchronous control programs for a plurality of axes that are necessary for the multi-axis synchronous control device shown in FIG. 1 to execute positioning control while synchronizing servo motors with each other.

FIG. 2 is a configuration example of a synchronous control program for one axis, that is, one of synchronous control programs for a plurality of axes that are necessary for the multi-axis synchronous control device shown in FIG. 1 to execute positioning control while synchronizing the servo motors with each other. The synchronous control program mentioned in the present embodiment is not written in a programming language, such as Basic or C language, and is referred to as "synchronous control program". This is because portions in which parts, such as a shaft, a gear, and a clutch, which have been used in the conventional multi-axis control without any servo motor are combined, and that are mechanically operated are all imaginarily formed in software, and the parts, such as a shaft, a gear, and a clutch, are arbitrarily combined in order to realize the synchronous control.

In FIG. 2, the synchronous control program for one axis is constituted by three types of software modules which are driving software modules 10, 13, and 20, transmitting software modules 11, 12, 14 to 19, and 21, and an output software module 22. The driving software modules 10, 13, and 20 have a function of generating and outputting reference position information for synchronization of a plurality of axes on which the multi-axis synchronous control device 1 executes positioning control. The transmitting software modules 11, 12, 14 to 19, and 21 have a function of calculating input information from the motion controller 2 and outputting a result of the calculation as transmitting information. The output software module 22 has a function of calculating input information from the motion controller 2 and outputting a result of the calculation as a command for controlling motor driving.

FIG. 2 depicts a synchronous control program for one axis that is set on the display screen of the general-purpose personal computer 5. As shown in FIG. 2, a plurality of software modules that constitute the synchronous control program for one axis are each arranged in a fixed manner in a 6×4 cells 30 arranged in a matrix, where the total number of the cells 30 is 24, and each of the cells 30 has a fixed horizontal and vertical size. This applies to the case with the synchronous control programs for two or more axes. Therefore, the display management of a software module group that constitutes each of the synchronous control programs for multiple axes can be facilitated.

While a configuration of the software module group that constitutes the synchronous control program has been determined, a plurality of different program configuration patterns can be prepared to be provided from a manufacturer to a user.

The driving software modules 10, 13, and 20 in the synchronous control program are divided into two types which are a main-axis driving software module 10 that serves as a driving source of the synchronous control, and auxiliary-axis driving software modules 13 and 20 that are used for adjusting the phase of an output software module, for performing a different operation from that of the main-axis driving software module 10, and for other purposes.

In the main-axis driving software module 10, the axis number setting is necessary for outputting a drive-controlling command to a servo motor. By setting the axis number to the same number, the motion controller 2 can execute the synchronous control by one program. Each software module can be set to either "executed" or "unexecuted".

Figure 3:
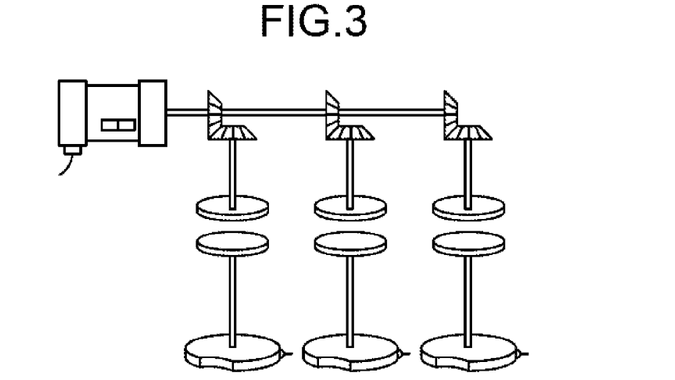
FIG. 3 is a diagram illustrating an example of synchronous control programs constituted by software modules that have been set to "executed".
Figure 4:
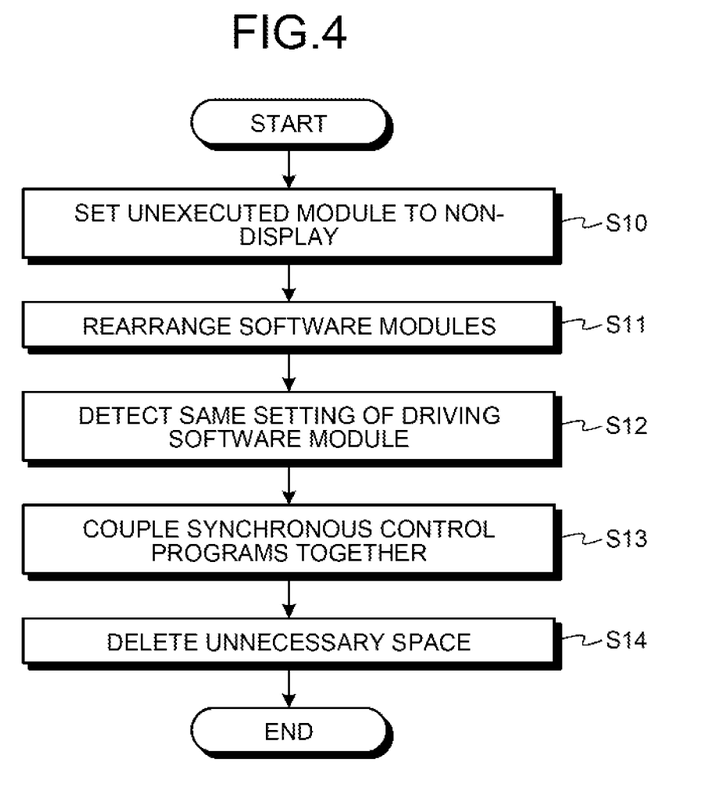
FIG. 4 is a flowchart of a process procedure for displaying synchronous control programs as shown in FIG. 3 as one synchronous control program.

FIG. 3 is an example of synchronous control programs constituted by software modules that have been set to "executed". FIG. 4 is a flowchart of a process procedure for displaying synchronous control programs as shown in FIG. 3 as one synchronous control program.

Figure 5:
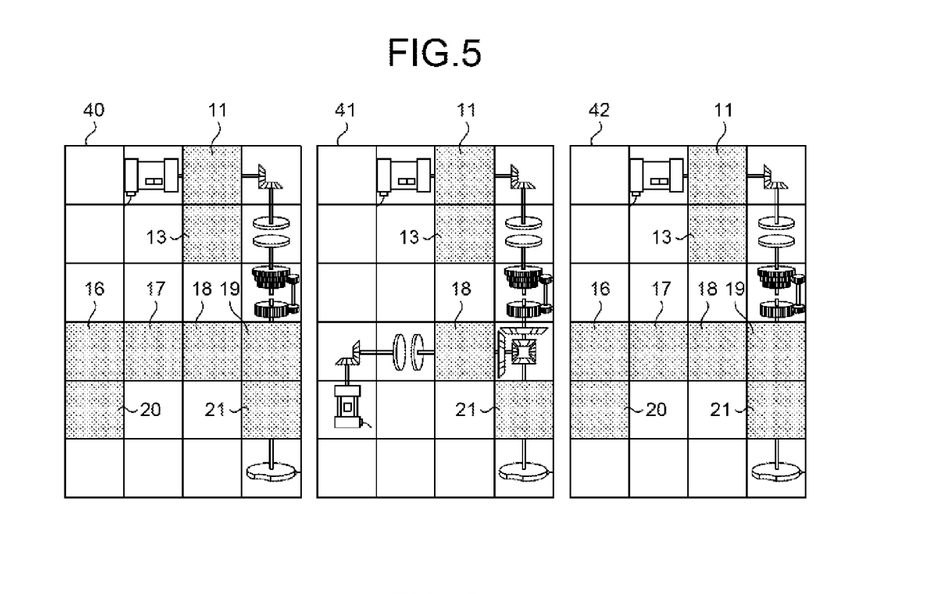
FIG. 5 is a diagram illustrating an example of synchronous control programs in which unexecuted software modules are set to non-display (shaded-display) at Step S10 shown in FIG. 4.

In FIG. 4, at Step S10, in all the synchronous control programs for axes on which the synchronous control is executed, unexecuted software modules are set to non-display. FIG. 5 is an example of synchronous control programs in which unexecuted software modules are set to non-display.

FIG. 5 depicts three synchronous control programs 40, 41, and 42 in which unexecuted software modules are set to non-display. In the synchronous control program 40 on the left side, the software modules 11, 13, and 16 to 21 are set to "unexecuted" and are in a non-display (shaded-display) state. In the synchronous control program 41 in the middle, the software modules 11, 13, 18, and 21 are set to "unexecuted" and are in a non-display (shaded-display) state. The synchronous control program 42 on the right side is in a state where the setting is the same as the synchronous control program 40.

In FIG. 5, in a software module configuration diagram in which the arrangement of the software modules is fixed, the unexecuted software modules are not displayed, which makes this space unnecessary and therefore makes it less easy to view the synchronous control programs.

Figure 6:
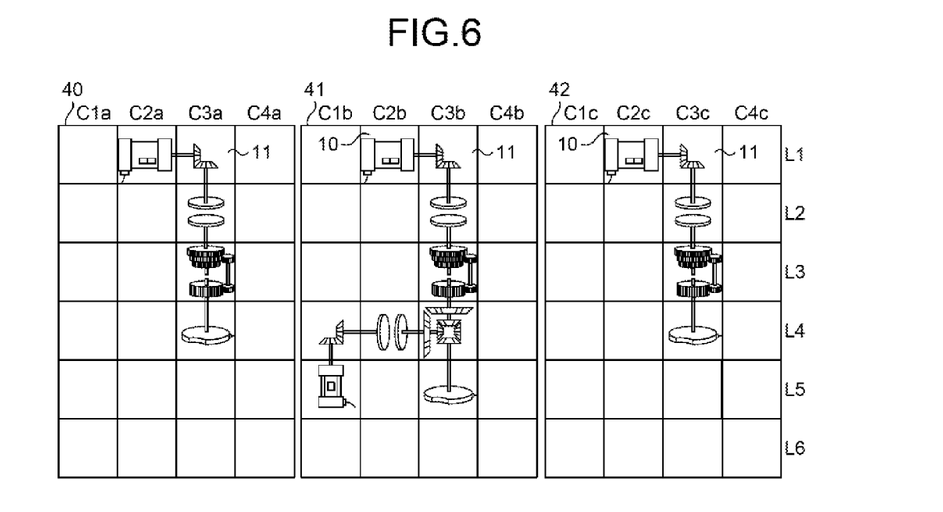
FIG. 6 is a diagram illustrating an example of synchronous control programs in which unexecuted software modules are set to non-display (deleted) and are rearranged at Step S11 shown in FIG. 4.

Accordingly, at next Step S11, the unexecuted software modules are hidden (deleted) to rearrange the software modules as shown in FIG. 6. In FIG. 6, 24 addresses are given respectively to 24 cells that constitute a display screen for the synchronous control program 40 on the left side of FIG. 5, where the 24 addresses are determined by the column number "C1$a$, C2$a$, C3$a$, and C4$a$" and the row number "L1 to L6". Furthermore, 24 addresses are given respectively to 24 cells that constitute a display screen for the synchronous control program 41 in the middle of FIG. 5, where the 24 addresses are determined by the column number "C1$b$, C2$b$, C3$b$, and C4$b$," and the row number "L1 to L6". Further, 24 addresses are given respectively to 24 cells that constitute a display screen for the synchronous control program 42 on the right side of FIG. 5, where the 24 addresses are determined by the column number "C1$c$, C2$c$, C3$c$, and C4$c$" and the row number "L1 to L6". FIG. 6 depicts a software module configuration diagram that is rearranged by retrieving and deleting hidden modules sequentially from the cell L1C1$a$ on the left side of the first row L1 toward the right side, and then from the second row L2 to the sixth row L6.

Next, at Step S12, in all the synchronous control programs for axes on which the synchronous control is executed, the synchronous control programs in which the axis number of the main-axis driving software module 10 is set to the same number are retrieved. Because there can be a plurality of patterns of combination of the synchronous control programs with the same axis number, this retrieval is performed on all the combinations of the axes.

Figure 7:
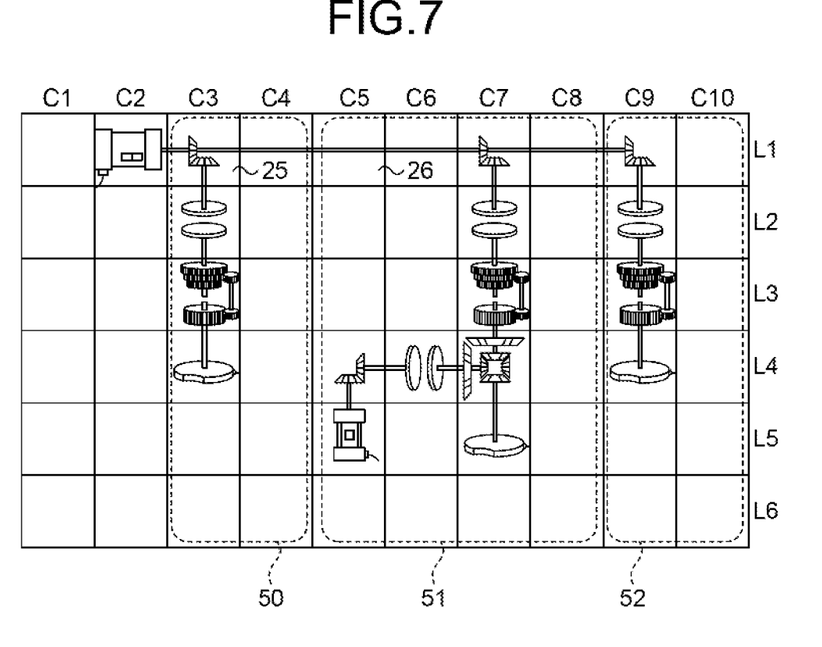
FIG. 7 is a diagram illustrating an example of a synchronous control program when a plurality of synchronous control programs are coupled together by the processes at Steps S13 and S14 shown in FIG. 4.

Next, FIG. 7 is an example of a synchronous control program when a plurality of synchronous control programs are coupled together by the processes at Steps S13 and S14 shown in FIG. 4. At Step S13, the synchronous control programs with the same axis number of the main-axis driving software module 10, which have been retrieved at Step S12 and each of which has a size of a cell frame having 6×4 cells arranged in a matrix, are arranged side by side (are coupled together) toward the right side, starting with the synchronous control program with the smallest axis number, thereby forming a synchronous control program with a size of a cell frame having 6×12 cells arranged in a matrix.

In order to couple the driving software modules in the synchronous control programs 40, 41, and 42 together, the software module 11 in each of the synchronous control programs 40 and 41 is changed to a connecting-gear software module 25 and the software module 10 in each of the synchronous control programs 41 and 42 is deleted. A connecting-shaft software module 26 is arranged in each of the cells L1C4$a$, L1C1$b$, L1C2$b$, L1C4$b$, L1C1$c$, and L1C2$c$, where a software module is not arranged, among the cells ranging from the cell L1C3 in the synchronous control program 40 to the cell L1C3 in the synchronous control program 42, to change the configuration to one synchronous control program.

Further, at next Step S14, unnecessary spaces are deleted from the synchronous control program that has been reconfigured by the process at Step S13. The column C1$a$ at the left end of the synchronous control program 40, and the columns C4$a$, C4$b$, and C4$c$ at the right ends of the respective synchronous control programs 40, 41, and 42 are maintained as spaces between the programs, and other portions (the columns C1$c$ and C2$c$ in FIG. 6) are deleted. Accordingly, one synchronous control program is obtained, which is displayed on a display screen having 10 columns and 6 rows defined by the column number C1 to C10 and the row number L1 to L6 shown in FIG. 7.

Also in the auxiliary-axis driving software modules 13 and 20, in the same manner as the main-axis driving software module 10, the synchronous control programs in which the axis number of the auxiliary-axis driving software modules 13 and 20 is set to the same number are retrieved, by the same-setting detection (Step S12) in the respective driving software modules, from all the synchronous control programs for axes on which the synchronous control is executed. However, this case is different from the case with the main-axis driving software module 10 in that associated synchronous control programs are not coupled together because the auxiliary-axis driving software modules 13 and 20 are not designed for the main axis. The set axis number is displayed in the auxiliary-axis driving software modules 13 and 20. A mouse pointer is operated on the auxiliary-axis driving software modules 13 and 20 to jump to the corresponding synchronous control program. The mouse pointer can be further operated to return to the original synchronous control program from the jumping-destination synchronous control program.

In a case of displaying a synchronous control program for a small number of axes, such as three axes, as shown in FIG. 7, the entire program can be viewed almost on one screen. However, a synchronous control program for several tens of axes extends too far in the horizontal direction. Therefore, in order to view the entire program, a method of scrolling the display screen in the horizontal direction or a method of using a function of enlarging or reducing the entire program is employed.

In the present embodiment, in a case of grouping each of the synchronous control programs 40, 41, and 42 before the coupling together, there are a group 50 of the cell columns C3 and C4, a group 51 of the cell columns C5 to C8, and a group 52 of the cell columns C9 and C10 in the synchronous control program in FIG. 7, where each of the groups 50, 51, and 52 is surrounded by the dotted line. It is possible to easily display/hide the groups 50, 51, and 52 in a collapsible mode by clicking the mouse pointer on a cell on the row L1 in an arbitrary group. Therefore, only a necessary group can be displayed. This not only makes it easier to view the synchronous control program, but also produces an effect of making it easier to check the program. Accordingly, a setting error can be prevented.

Figure 8:
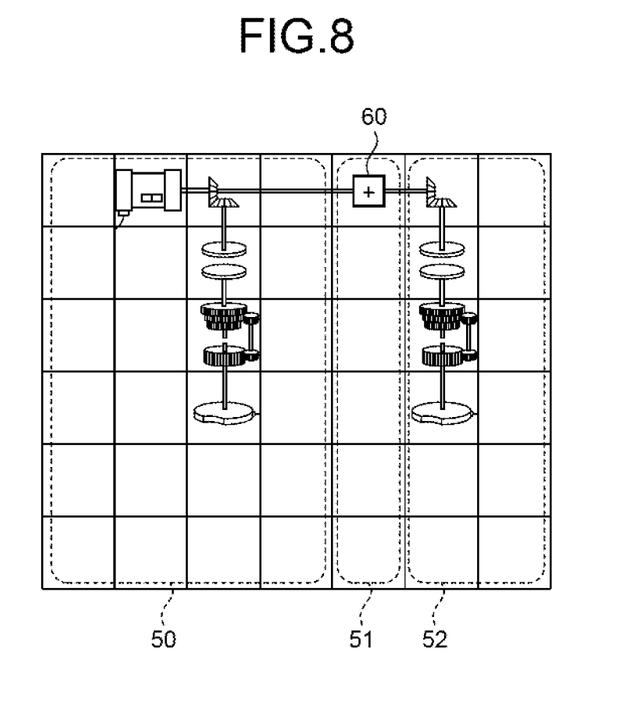
FIG. 8 is a diagram illustrating an example of a synchronous control program when one of three groups shown in FIG. 7 is displayed in a collapsed state.

FIG. 8 is an example of a synchronous control program when one of the three groups shown in FIG. 7 is displayed in a collapsed state. In FIG. 8, a collapsing icon 60 is displayed on the cell on the row L1 in the group 51, which indicates that the group 51 is displayed in a collapsed state.

When the group 51 is displayed in a collapsed state, the columns C5 to C8 are hidden and the collapsing icon 60 is additionally displayed so as to show that the group 51 is displayed in a collapsed state. However, when a group adjacent to the group 51 displayed in a collapsed state, that is the group 50 in FIG. 7, is also displayed in a collapsed state, the columns C1 to C4 are also hidden in the same way as the group 51 displayed in a collapsed state; however, an additional column for the collapsing icon 60 is not provided.

When the collapsing icon 60 is clicked in the group displayed in a collapsed state, this group having been hidden is displayed again. In a case where adjacent groups for a plurality of axes are hidden, each time the collapsing icon 60 is clicked, a group is displayed again sequentially starting from the group located on the right side. At this point, it is also possible to display all the groups that have been displayed in a collapsed state at one time again.

The driving-software-module portions of the synchronous control program 40 arranged at the left end and having the smallest axis number, that is the columns C1 and C2, are not intended to be displayed in a collapsible mode. Also, the synchronous control program 42 arranged at the right end and having the largest axis number is not intended to be displayed in a collapsible mode. In a case where a plurality of adjacent groups are displayed in a collapsed state, the collapsing icons 60 can be displayed as many as the number of the adjacent groups displayed in a collapsed state in order to select an arbitrary group in between the adjacent groups and cancel its display in a collapsed state.

Figure 9:
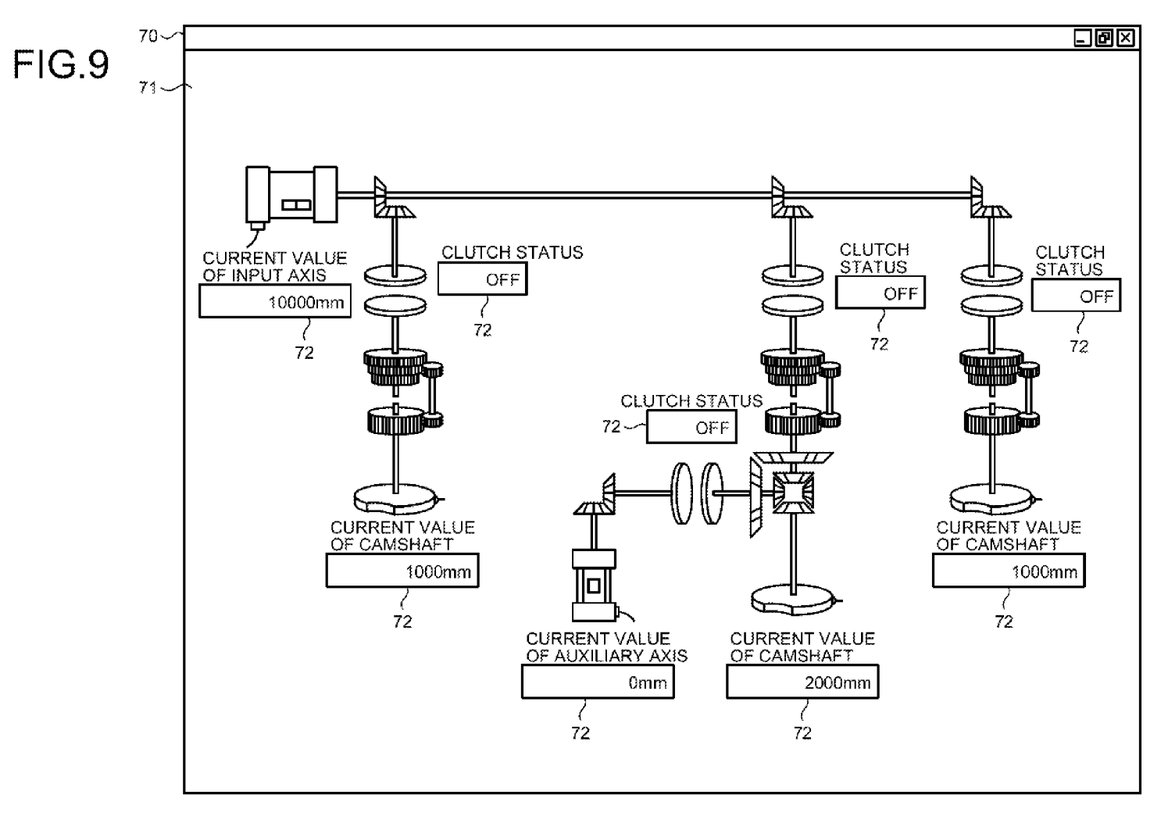
FIG. 9 is a diagram illustrating an example in which status information is displayed on a display screen for a synchronous control program.
Figure 10:
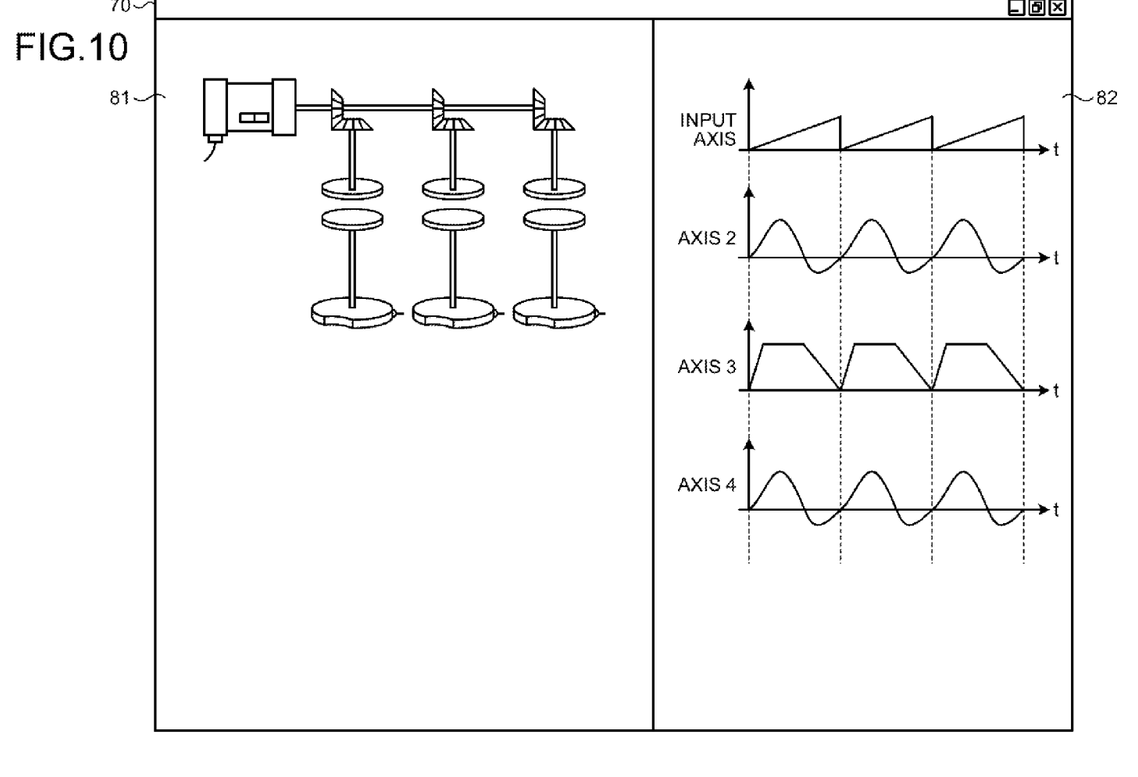
FIG. 10 is a diagram illustrating an example in which a waveform graph of an input axis and output axes is displayed on a display screen for a synchronous control program.
Figure 11:
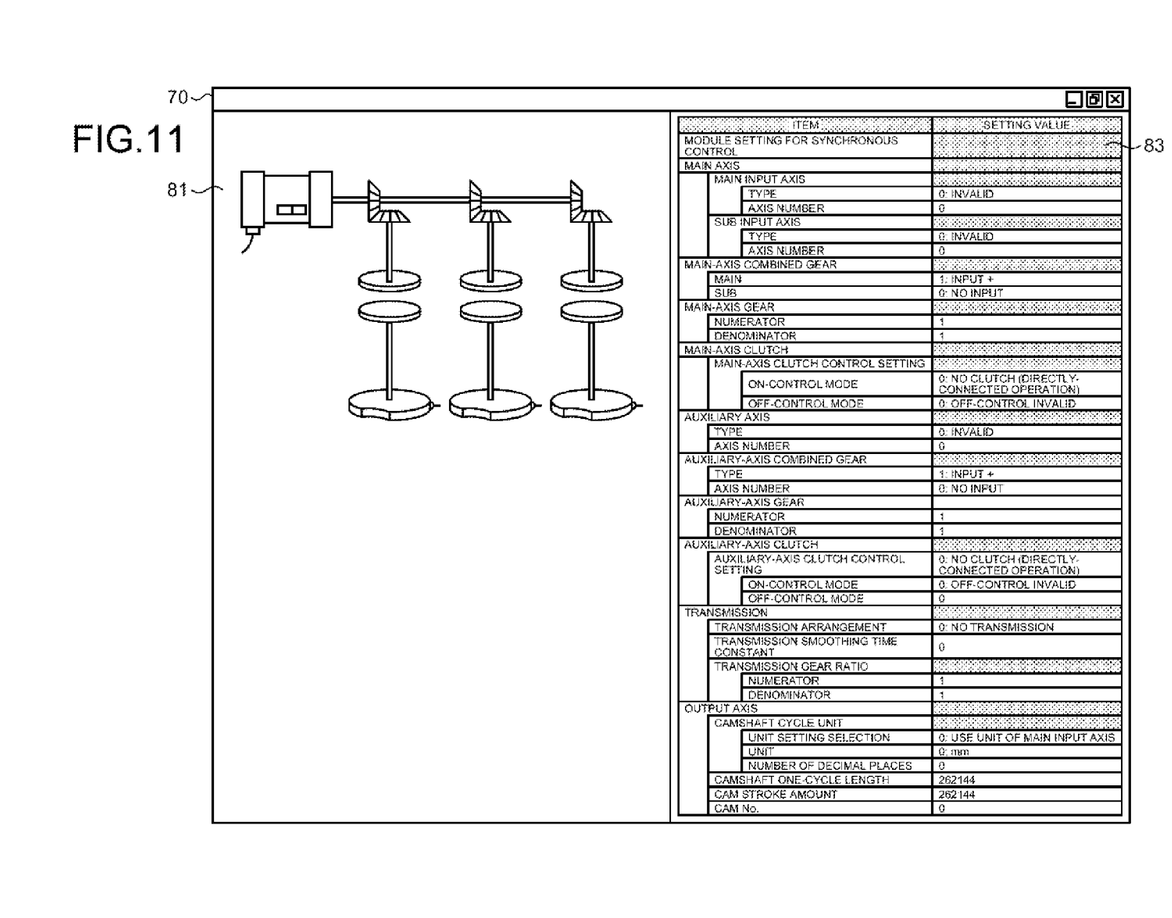
FIG. 11 is a diagram illustrating an example in which a parameter setting screen is displayed on a display screen for a synchronous control program.

Next, with reference to FIGS. 9 to 11, a display mode is explained in which operating states of software modules are also displayed on the display screen for the synchronous control program. FIG. 9 is a diagram illustrating an example in which status information is also displayed on a display screen for a synchronous control program. FIG. 10 is a diagram illustrating an example in which a waveform graph of an input axis and output axes is also displayed on a display screen for a synchronous control program. FIG. 11 is a diagram illustrating an example in which a parameter setting screen is also displayed on a display screen for a synchronous control program.

FIG. 9 illustrates an example in which status information 72 on each software module during execution of the synchronous control program by the motion controller 2 is received from the motion controller 2 and displayed on a window screen 70 of the general-purpose personal computer 5, which displays one synchronous control program 71 that is reconfigured by coupling a plurality of associated synchronous control programs together. Examples of the status information 72 include the current position, the speed, the operating direction, the operating state, the error number, the warning number, and the setting state.

The status information 72 received from the motion controller 2 can be displayed one after another on the window screen 70 of the general-purpose personal computer 5, which displays the synchronous control program 71 that is in the process of realizing multi-axis synchronization. Therefore, the operating state of the multi-axis synchronous control device 1 can be understood, and simultaneously there is an effect of improving debug efficiency of the synchronous control program 71.

There is another display method of the status information 72, for example, in which the status information 72 is collected together and displayed in a table format, and then the status information 72 and a coupled synchronous control program 71 are arranged side by side on the same screen. Status information on a software module, displayed in a collapsed state as shown in FIG. 8, is not displayed.

Next, a display method shown in FIG. 10 is explained. As shown in FIG. 3, in a case where the motion controller 2 executes positioning control by synchronizing a plurality of output software modules with each other relative to one main-axis driving software module 10, the command waveform of the input axis and the operation waveform of each output axis, which are obtained at this point, are important elements for the motion controller 2 to examine the operation of the multi-axis synchronous control device.

In the present embodiment, when the general-purpose personal computer 5 requests the motion controller 2 for waveform data of all the axes displayed in FIG. 7 or FIG. 8, the motion controller 2 starts sampling the waveform according to the request. When the motion controller 2 completes the sampling, the motion controller 2 outputs a completion notification and the obtained waveform data to the general-purpose personal computer 5. The general-purpose personal computer 5, having received the waveform data from the motion controller 2, generates a waveform graph 82 displayed in the vertical direction with the time axes of the waveform data for respective axes aligned with each other. The general-purpose personal computer 5 displays the generated waveform graph 82 on the window screen 70 that displays a synchronous control program 81. This is the display mode shown FIG. 10. In FIG. 10, each waveform of the input axis and three output axes (axis 2, axis 3, and axis 4) is shown as the waveform graph 82.

There is another waveform-graph displaying method, for example, in which a waveform sampled by the simulation is displayed. The waveform graph of the modules displayed in a collapsed state as shown in FIG. 8 is not displayed.

Using the display of the waveform graph 82 shown in FIG. 10 in combination with the display of the status information 72 on the software modules shown in FIG. 9 can produce an effect of facilitating examination of the operation of the multi-axis synchronous control device and reducing debugging man-hours.

Next, FIG. 11 illustrates an example in which, on the window screen 70 that displays the synchronous control program 81, parameter setting 83 of the synchronous control program 81 that is being displayed on the window screen 70 is displayed instead of the status information 72 and the waveform graph 82.

In the parameter setting of a conventional synchronous control program, the displays shown in FIG. 2 and FIG. 10 are provided on the same display screen. Therefore, there are screens as many as the number of axes on which the motion controller 2 is capable of controlling driving, and parameters are set for each axis.

In contrast to that, in the present embodiment, even when a plurality of associated synchronous control programs are coupled together into one synchronous control program 81, the parameter setting 83 can be displayed with the synchronous control program 81 on the same screen. Therefore, when a cell of an arbitrary software module is clicked with the mouse pointer, parameter setting values for the respective groups 50, 51, and 52 in the areas shown by the dotted frames, that are parameter setting values for the respective axes, are displayed in a parameter-setting list.

In the present embodiment, when a cell on which a software module is arranged is clicked, a setting-value field of the software module in the parameter-setting list switches into an editing mode. Therefore, the number of user operations, such as mouse-pointer operations and screen switching operations, can be reduced.

The synchronous control programs 71 and 81, the waveform graph 82, and the parameter setting 83, which are shown in FIGS. 9, 10, and 11, can be displayed in any combination on the same screen, and a screen to be displayed can be selected depending on the circumstances.

INDUSTRIAL APPLICABILITY

As described above, because the display method of a synchronous control program for controlling driving of a multi-axis synchronous control device according to the present invention can display synchronous control programs of a multi-axis configuration on one screen, the display method is useful as a display method of a synchronous control program for controlling driving of a multi-axis synchronous control device capable of efficiently performing display and setting of a software module configuration of the synchronous control programs of a multi-axis configuration.

REFERENCE SIGNS LIST

1 multi-axis synchronous control device
2 motion controller
3a, 3b, 3cservo amplifier
4a, 4b, 4cservo motor
5 general-purpose personal computer
10, 13, 20 driving software module
11, 12, 14 to 19, 21 transmitting software module
22 output software module
25 connecting-gear software module
26 connecting-shaft software module
30 cell
40, 41, 42, 71, 81 synchronous control program
50, 51, 52 group
60 collapsing icon
70 window screen of general-purpose personal computer (display screen)
72 status information
82 waveform graph
83 parameter setting

The invention claimed is:

1. A display method of a synchronous control program for controlling driving of a multi-axis synchronous control device which executes positioning control while synchronizing axes with each other
the method comprises:
displaying on one screen of a display device a synchronous control program of a multi-axis configuration, in which driving software modules are coupled together into the same axis, among synchronous control programs generated by a control device and respectively corresponding to axes on which a multi-axis synchronous control device executes positioning control and outputs, by the control device, the generated synchronous control programs, and
selecting either execution or non-execution of a module operation of each of a plurality of software modules that constitute the synchronous control program of a multi-axis configuration after displaying the software modules on the display screen of the display device in a state where the software modules respectively correspond to a plurality of cells arranged in a matrix, and
displaying the synchronous control program of a multi-axis configuration in such a manner that software modules having been selected as execution at the selecting step are directly connected to each other by removing cells that correspond to software modules having been selected as non-execution at said selecting, while storing a coupling relationship between the software modules having been selected as execution at the selecting.

2. The display method according to claim 1, wherein the displaying comprising setting a synchronous control program, by the control device, for one axis as one block and performing one of displaying and hiding a synchronous control program for an arbitrary axis in a collapsible mode block by block.

3. The display method according to claim 2, wherein the displaying comprises displaying, by the display device under the control of the control device, status information on each software module of each axis corresponding to a block that is in a state of being displayed in the collapsible mode in the synchronous control program of a multi-axis configuration on a same display screen as the synchronous control program of a multi-axis configuration.

4. The display method according to claim 2, wherein the displaying comprising displaying by the display device under the control of the control device an operation waveform of each axis corresponding to a block that is in a state of being in the collapsible manner on a same display screen as the synchronous control program of a multi-axis configuration.

5. The display method according to claim 2, wherein the displaying comprises display by the display device under the control of the control device, a parameter setting list of a plurality of software modules of each axis corresponding to a block that is in a state of being displayed in the collapsible mode in the synchronous control program of a multi-axis configuration on a same display screen as the synchronous control program of a multi-axis configuration.

6. The display method according to claim 2, wherein the displaying comprises displaying by the display device under the control of the control device, status information on each software module of each axis corresponding to a block that is in a state of being displayed in the collapsible mode, the status information being read from the multi-axis synchronous control device, an operation waveform of each axis corresponding to a block that is in a state of being displayed in the collapsible mode, the operation waveform being read from the multi-axis synchronous control device, and a parameter setting list of a plurality of software modules of each axis corresponding to a block that is in a state of being displayed in the collapsible mode in the synchronous control program of a multi-axis configuration while switching between the status information, the operation waveform, and the parameter setting list, on a same display screen as the synchronous control program of a multi-axis configuration.

* * * * *